（12） United States Patent
Chen et al.

(10) Patent No.: US 7,113,396 B2
(45) Date of Patent: Sep. 26, 2006

(54) MOUNTING BRACKET FOR POWER SUPPLY

(75) Inventors: Yun Lung Chen, Tu-chen (TW); Da-Long Sun, Shenzhen (CN); Li Tong, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 255 days.

(21) Appl. No.: 10/340,265

(22) Filed: Jan. 9, 2003

(65) Prior Publication Data

US 2004/0105222 A1 Jun. 3, 2004

(30) Foreign Application Priority Data

Nov. 29, 2002 (TW) .............................. 91219301 U

(51) Int. Cl.
*G06F 1/16* (2006.01)
(52) U.S. Cl. .................. 361/683; 361/725; 312/223.2; 16/271
(58) Field of Classification Search ........ 361/679–687, 361/724–727, 825; 312/223.1–223.6; 16/266, 16/268, 271; 369/75.1
See application file for complete search history.

(56) References Cited

U.S. PATENT DOCUMENTS

| 6,462,961 | B1 * | 10/2002 | Johnson et al. ............. 361/825 |
| 6,530,628 | B1 * | 3/2003 | Huang et al. ............ 312/223.2 |
| 6,560,097 | B1 * | 5/2003 | Naruo et al. ................ 361/685 |

* cited by examiner

*Primary Examiner*—Hung Van Duong
(74) *Attorney, Agent, or Firm*—Wei Te Chung

(57) ABSTRACT

A mounting bracket (40) for mounting different types of power supplies (10) having different configurations of screw holes (14) to a computer enclosure (20) includes a body (41) for being attached to one of the power supplies. A plurality of countersunk portions (52) is defined in the body to configure such that selected of the through holes correspond to screw holes of the one of the power supplies. An L-shaped latch (44) is formed on a top portion of the body for suspending on the enclosure. A tab (46) depends from the body and defines a screw aperture (48) for engaging with a screw (60) which extends through the enclosure. A first rolled hook (50) and a second rolled hook (58) are formed outwardly from the body for engaging with the enclosure. A plurality of spring fingers (60) is formed in the body for electrically connecting with the enclosure.

16 Claims, 3 Drawing Sheets

MOUNTING BRACKET FOR POWER SUPPLY

BACKGROUND OF THE INVENTION

1. Field of the Invention

The present invention relates to mounting brackets for attaching electronic components to equipment such as computer enclosures, and more particularly to a mounting bracket which can mount different types of power supplies having different configurations of screw holes.

2. Description of the Related Art

Many types of electronic equipment such as computer systems include power supplies which convert incoming alternating current to direct current. Direct current is suitable for operating various electrical components within such equipment. With the constant development of new electronic equipment, more and more components are required to be included within an electronic equipment enclosure. A power supply is generally one of the largest components in an electronic equipment enclosure. Thus the means of securing a power supply to electronic equipment determines the overall configuration of the equipment.

A power supply is often directly secured to a rear panel of a computer enclosure by screws. This makes the process of assembly unduly laborious and time-consuming. Furthermore, various different power supplies have screw holes located in a variety of different positions. Generally, a given rear panel defines a plurality of through holes, and can only fit one kind of power supply that has matching screw holes.

As a result, hinges have been developed to secure a power supply to an enclosure. Examples are disclosed in U.S. Pat. Nos. 5,172,305 and 5,745,342. The hinges allow the power supply to be pivotally moved out of its normal installed position, thereby allowing users to access other components in the enclosure adjacent the power supply. However, manufacturing of such hinges adds extra components and increases costs. In addition, it can be awkward and troublesome to attach a power supply to an enclosure using such hinges.

SUMMARY OF THE INVENTION

Accordingly, an object of the present invention is to provide a mounting bracket which can easily and securely mount different types of power supplies having different configurations of screw holes to a computer enclosure.

To achieve the above object, a mounting bracket for mounting power supplies having various different configurations of screw holes to a computer enclosure in accordance with the present invention comprises a body attached to one power supply. A plurality of countersunk portions is defined in the body and configured such that selected of the through holes corresponds to screw holes of the one of the power supplies. A fringe is bent forward from a top edge of the body. A middle portion of the fringe is bent upward and then rearward to form an L-shaped latch for suspending on a flange of the enclosure. A tab depends from a bottom edge of the body and defines a screw aperture for engaging with a screw which extends through the enclosure. A first rolled hook and a second rolled hook are formed outwardly from the body for engaging with the enclosure. A plurality of spring fingers is formed in the body around a periphery thereof, for electrically connecting with the enclosure.

Other objects, advantages and novel features of the present invention will be drawn from the following detailed description of a preferred embodiment of the present invention with the attached drawings, in which:

DESCRIPTION OF THE PREFERRED EMBODIMENT

Figure 1:
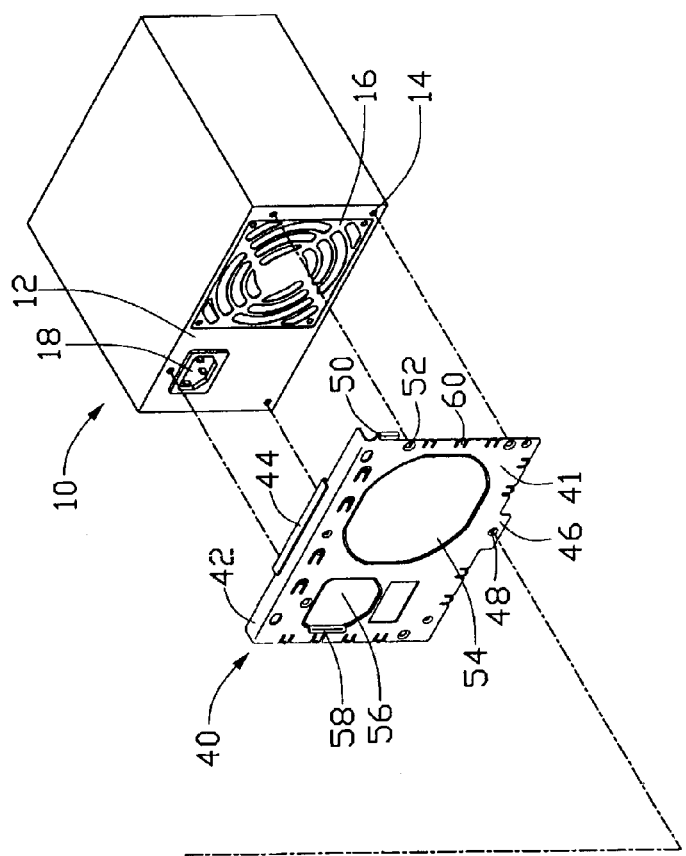
FIG. 1 is an exploded, isometric view of a mounting bracket in accordance with a preferred embodiment of the present invention together with a power supply and a computer enclosure.
Figure 1:
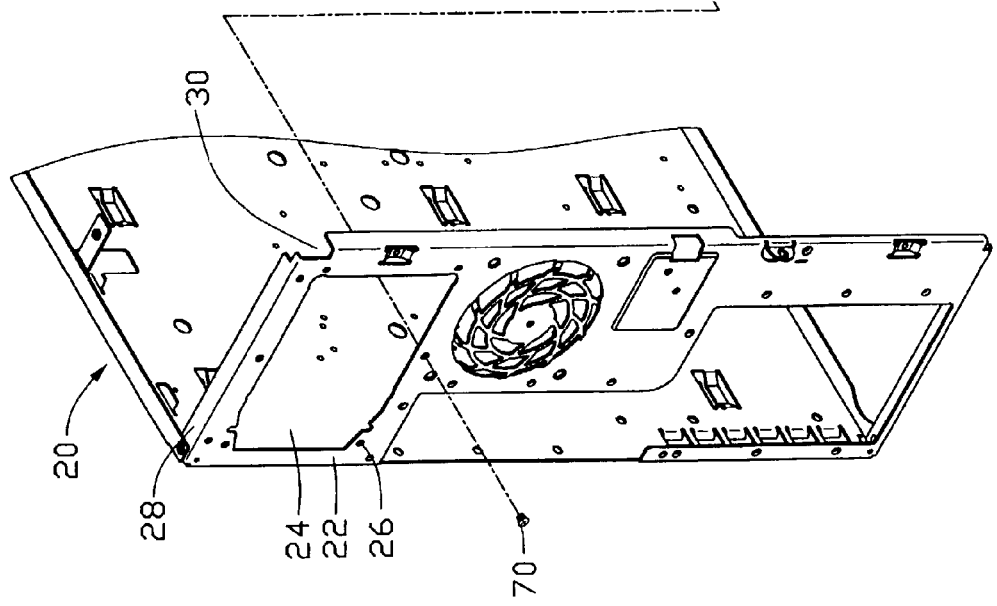

Referring to FIG. 1, a mounting bracket 40 in accordance with a preferred embodiment of the present invention is provided for attaching a power supply 10 to a computer enclosure 20. The power supply 10 comprises a rear surface 12. A plurality of screw holes 14 is defined in peripheral portions of the rear surface 12. A ventilating grille 16 for heat dissipation is defined in a right portion of the rear surface 12. A mains socket 18 is formed in a left portion of the rear surface 12.

The enclosure 20 comprises a rear panel 22. An opening 24 is defined in an upper portion of the rear panel 22, for exposing the power supply 10 to an exterior of the rear panel 22. A through hole 26 is defined in the rear panel 22 below a middle of the opening 24, for extension of a screw 70 therethrough to engage in the mounting bracket 40. A flange 28 is bent inwardly from a top edge portion of the rear panel 22. A gap 30 is defined in a junction of a top right corner of the rear panel 22 and the flange 28.

The mounting bracket 40 comprises a rectangular body 41. A plurality of countersunk portions 52 is defined in peripheral portions of the body 41. Certain of the countersunk portions 52 correspond to the screw holes 14 of the power supply 10. The countersunk portions 52 are configured so that various different combinations thereof correspond to various different types of power supplies having various different configurations of screw holes. A first rolled hook 50 is formed from a right side edge of the body 21. First and second cutouts 54, 56 are defined in the body 41, for exposing the ventilating grille 16 and the socket 18 of the power supply 10 respectively to an exterior of the rear panel 22. A second rolled hook 58 is formed outwardly from the body 41 at a side extremity of the second cutout 56. A fringe 42 is bent forwardly from a top edge portion of the body 41. A middle portion of the fringe 42 is bent upwardly and then rearward to form a latch 44. A profile of the latch 44 is L-shaped. A tab 46 depends from a central portion of a bottom edge of the body 41. A screw aperture 48 is defined in the tab 46. A plurality of spring fingers 60 is formed in the body 41 around a periphery thereof, for electrically connecting with the rear panel 22.

Figure 2:
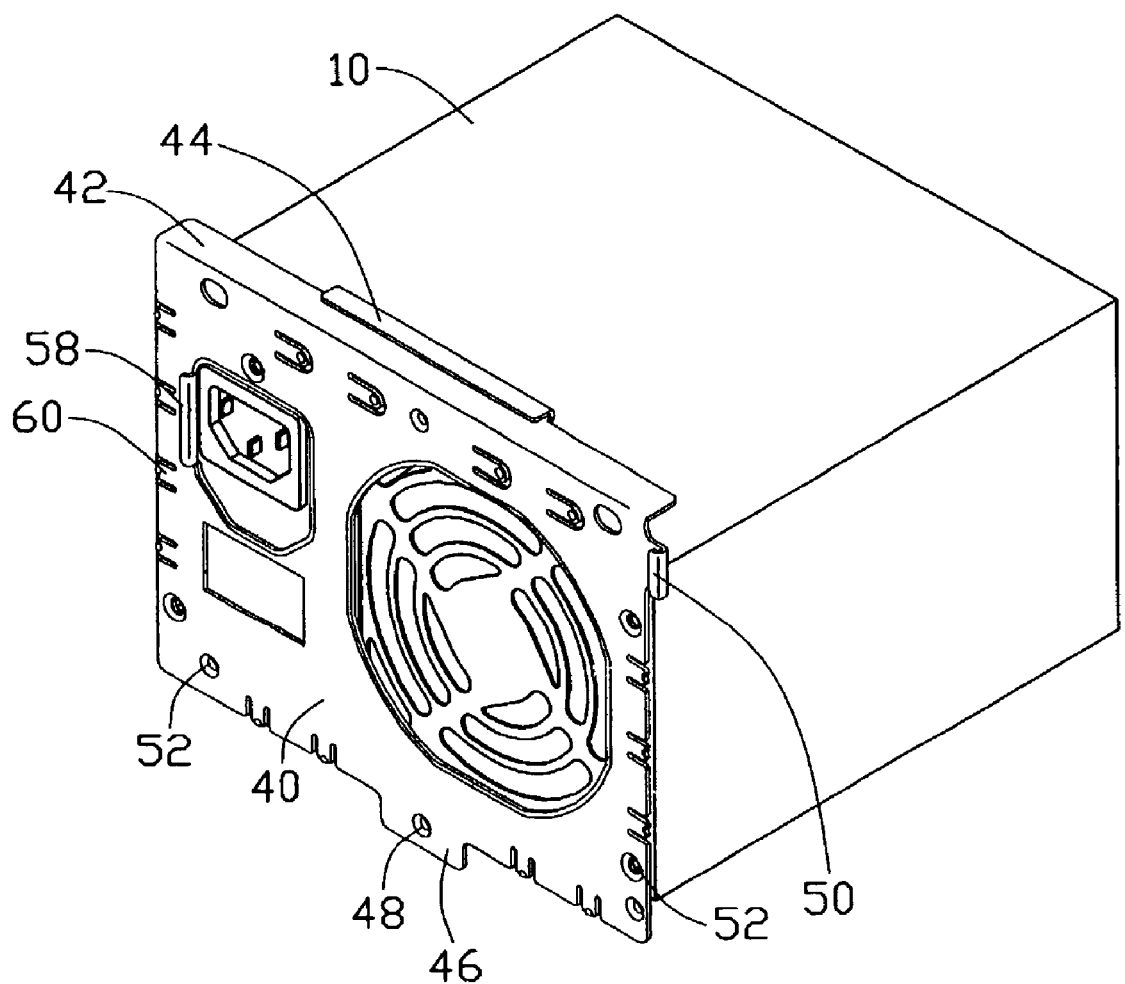
FIG. 2 is an enlarged, isometric view of the mounting bracket and power supply of FIG. 1 attached together.
Figure 3:
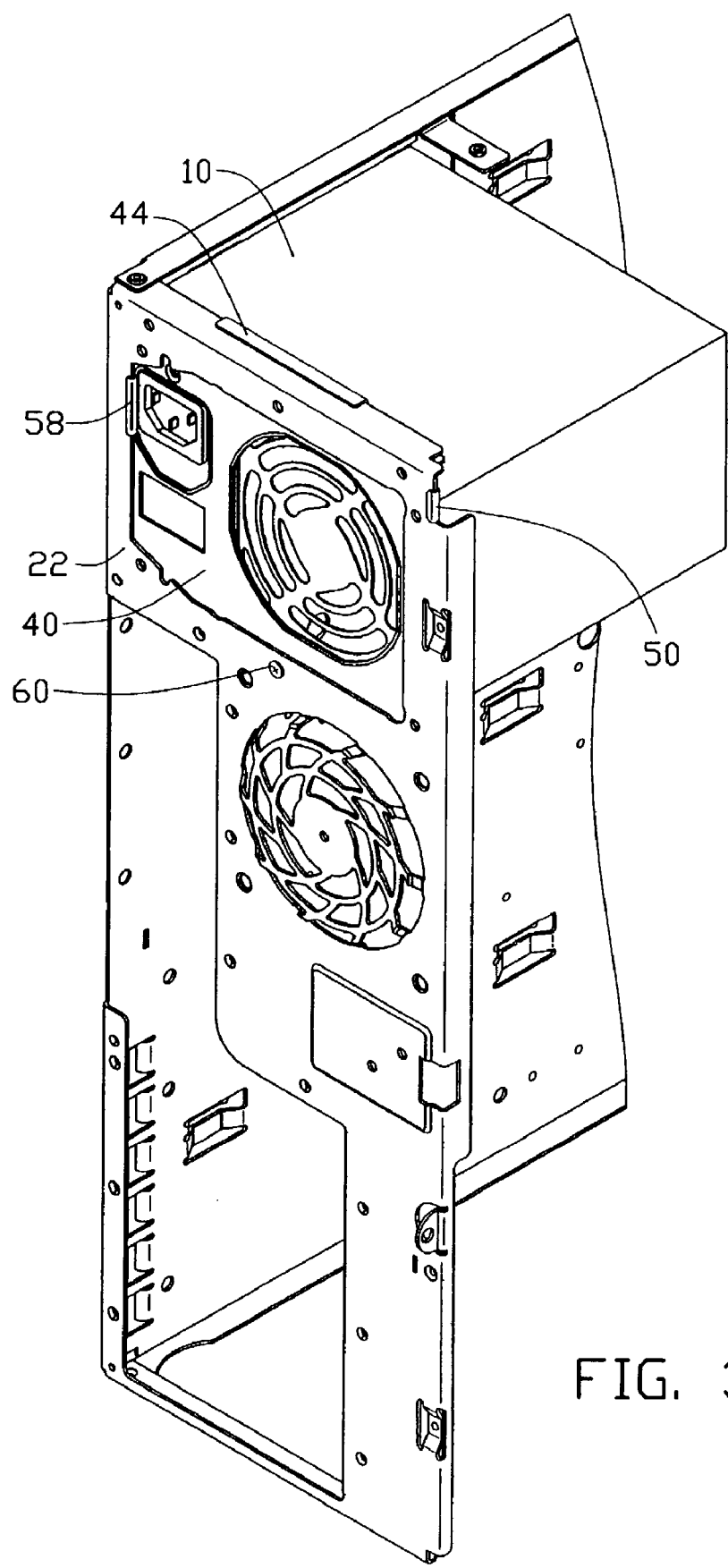
FIG. 3 is an assembled view of FIG. 1.

Referring also to FIGS. 2 and 3, in assembly, the mounting bracket 40 is attached to the rear surface 12 of the power supply 10. Screws (not shown) are extended through the appropriate countersunk portions 52 to engage in the screw holes 14 of the power supply 10. The combined power supply 10 and mounting bracket 40 is then attached to the rear panel 22 of the enclosure 20. The latch 44 is supported on the flange 28, and suspends therefrom. The combined power supply 10 and mounting bracket 40 is pushed leftward until the first rolled hook 50 engages with an edge of the rear panel 22 in the gap 30 and the second rolled hook 58 engages with the rear panel 22 in the opening 24. The screw 70 is extended through the through hole 26 to engage in the screw aperture 48 of the mounting bracket 40. The spring fingers 60 are sandwiched between the body 41 and the rear panel 22 thereby electrically connecting the mounting bracket 40 and the enclosure 20. Thus, the combined power supply 10 and mounting bracket 40 is securely attached to the rear panel 22 of the enclosure 20.

In the present invention, the countersunk portions 52 of the body 41 of the mounting bracket 40 are configure so that various different combinations thereof correspond to various different types of power supplies having various different configurations of screw holes. Accordingly, the same mounting bracket 40 can be used to mount a variety of different types of power supplies 10.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting bracket for attaching any of various different kinds of power supplies to an enclosure, the mounting bracket comprising:
    a body adapted to be attached to any one of the power supplies, the body defining a plurality of through holes configured such that selected of the through holes correspond to screw holes of said any one of the power supplies;
    an attaching means for detachably engaging with the enclosure, the attaching means comprising an latch formed on a top of the body suspending from a fixed portion of the enclosure, the attaching means further comprising a first rolled hook formed at one side of the body for engaging with an edge portion of the enclosure, and a second rolled hook at an opposite side of the body for engaging with another edge portion of the enclosure; and
    a locking means for fixedly engaging with the enclosure, whereby said any one of the power supplies can be mounted to the enclosure.

2. The mounting bracket as claimed in claim 1 further comprising a fringe extending perpendicularly from a top portion of the body, the latch being L-shaped and extending upwardly from a distal edge of the fringe.

3. The mounting bracket as claimed in claim 1, wherein the locking means comprises a tab depending from a bottom portion of the body, and a screw aperture defined in the tab for engagingly receiving a screw extended through the enclosure.

4. The mounting bracket as claimed in claim 1, wherein the body defines a pair of cutouts for exposing a ventilating grille and a socket of the power supply to an outside of the enclosure.

5. A mounting bracket assembly for power supplies, comprising:
    a computer enclosure comprising a panel defining an opening for exposing any one of the power supplies to an outside of the panel; and
    a mounting bracket comprising:
        a body adapted to be attached to said any one of the power supplies, the body defining a plurality of through holes configured such that selected of the through holes correspond to screw holes of said anyone of the power supplies; and
        a securing means for engaging with the panel and thereby mounting said any one of the power supplies to the enclosure, a first rolled hook and a second rolled hook formed on opposite sides of the body to engage with opposite edge portions of the enclosure.

6. The mounting bracket assembly as claimed in the claim 5, wherein a flange extends inwardly from a top edge of the panel, and the securing means comprises a latch supported on the flange.

7. The mounting bracket assembly as claimed in the claim 5, wherein the panel defines a gap in a top corner to engage with the first rolled hook.

8. The mounting bracket as claimed in claim 5, wherein the panel defines a through aperture, the securing means comprises a tab depending from a bottom portion of the body, the tab defines a screw aperture therein, and a screw extends through the through aperture to engage in the screw aperture.

9. The mounting bracket assembly as claimed in claim 5, wherein the body comprises a plurality of spring fingers around a periphery thereof for electrically connecting with the panel.

10. The mounting bracket assembly as claimed in claim 5, wherein the body defines a pair of cutouts in communication with the opening for exposing a heat dissipation ventilating grille and a socket of the power supply to an outside of the panel of the enclosure.

11. The mounting bracket assembly as claimed in the claim 6, wherein the mounting bracket further comprises a fringe extending perpendicularly from a top portion of the body, the latch extending upwardly from a distal edge of the fringe of the mounting bracket.

12. The mounting bracket as claimed in claim 7, wherein the second rolled hook engages with the panel in the opening.

13. A mounting bracket assembly comprising:
    a computer panel defining opposite interior and exterior faces thereof and an opening therethrough in a front-to-back direction;
    a mounting bracket including a rectangular planar body defining a contour slightly larger than the opening, and a plurality of cutouts therein; and
    a power supply including ventilating grills and a socket exposed thereon in alignment with the corresponding cutouts along said front-to-back direction, respectively, wherein
    the mounting bracket is first secured to the power supply, and then the assembled mounting bracket and power supply are attached to the interior face of the panel in alignment with said opening under a condition that said bracket is sandwiched between said the panel and said power supply.

14. The mounting bracket assembly as claimed in claim 13, wherein the amounting bracket comprises an L-shaped latch suspending from a fixed portion of the enclosure.

15. The mounting bracket assembly as claimed in claim 13, wherein the mounting bracket further comprises a pair of rolled books formed at opposite sides of the body respectively for engaging with edge portions of the enclosure.

16. The mounting bracket assembly as claimed in claim 13, wherein the mounting bracket comprises a tab depending from a bottom portion of the body, and a screw aperture defined in the tab for engagingly receiving a screw extended through the enclosure.

* * * * *